United States Patent [19]

Gysel

[11] Patent Number: 5,136,641
[45] Date of Patent: Aug. 4, 1992

[54] SCRAMBLED VIDEO DIGITAL TRANSMISSION LINK

[75] Inventor: Hermann Gysel, San Jose, Calif.

[73] Assignee: Synchronous Communications, Inc., San Jose, Calif.

[21] Appl. No.: 632,463

[22] Filed: Dec. 20, 1990

[51] Int. Cl.$^5$ .................................. H04N 7/167
[52] U.S. Cl. ............................ 380/15; 380/10
[58] Field of Search ............................ 380/10, 15

[56] References Cited

U.S. PATENT DOCUMENTS

| | | | |
|---|---|---|---|
| 4,623,920 | 11/1986 | Defresne et al. | 380/10 |
| 4,688,246 | 8/1987 | Eilers et al. | 380/10 |
| 4,688,249 | 8/1987 | Hayes et al. | 380/10 |
| 5,040,211 | 8/1991 | Schrieber | 380/10 |

Primary Examiner—Thomas H. Tarcza
Assistant Examiner—David Cain
Attorney, Agent, or Firm—Fliesler, Dubb, Meyer & Lovejoy

[57] ABSTRACT

A scrambled video digital transmission link comprising an amplitude modulator, a scrambler, an amplitude demodulator and frequency conversion apparatus for providing a scrambled video signal in a baseband format and a modified sound signal which includes video sync information which is used to restore the video signal for use in a subscriber's television set. The scrambled video signal in the baseband format and the modified sound signal are converted to a digital signal before transmission by a laser driven fiber optic transmission line to a hub station. In the hub station there is provided digital-to-analog signal converting apparatus, amplitude modulating apparatus and frequency conversion apparatus for recreating the scrambled video signal and modified sound signal generated in the head end station. The signals transmitted between the transmitter and the receiver may be in a digital pulse code modulation (PCM) format or in a format produced by digital modulation of an r.f. carrier, such as quarternary phase shift keying (QPSK) techniques.

26 Claims, 10 Drawing Sheets

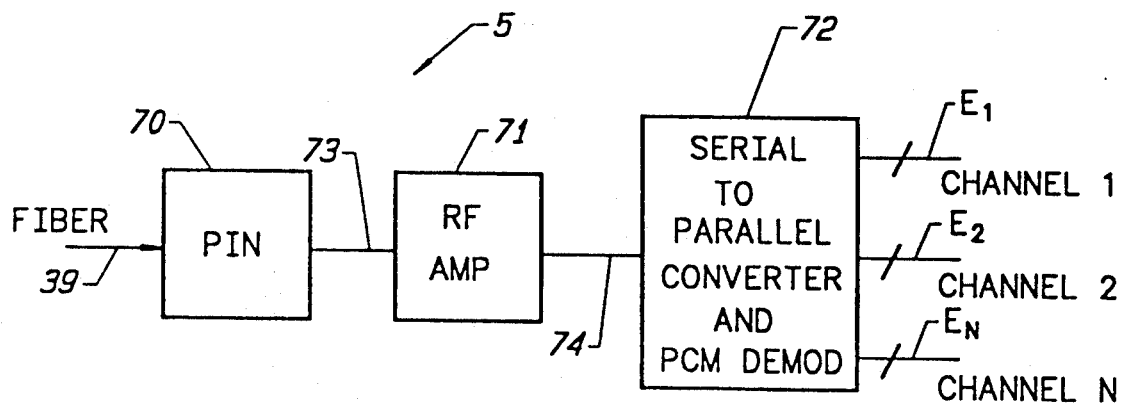
FIG. 5
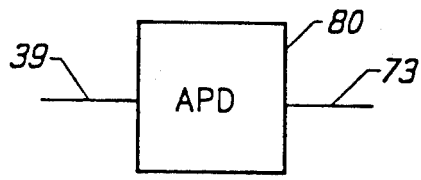
FIG. 6
FIG. 7
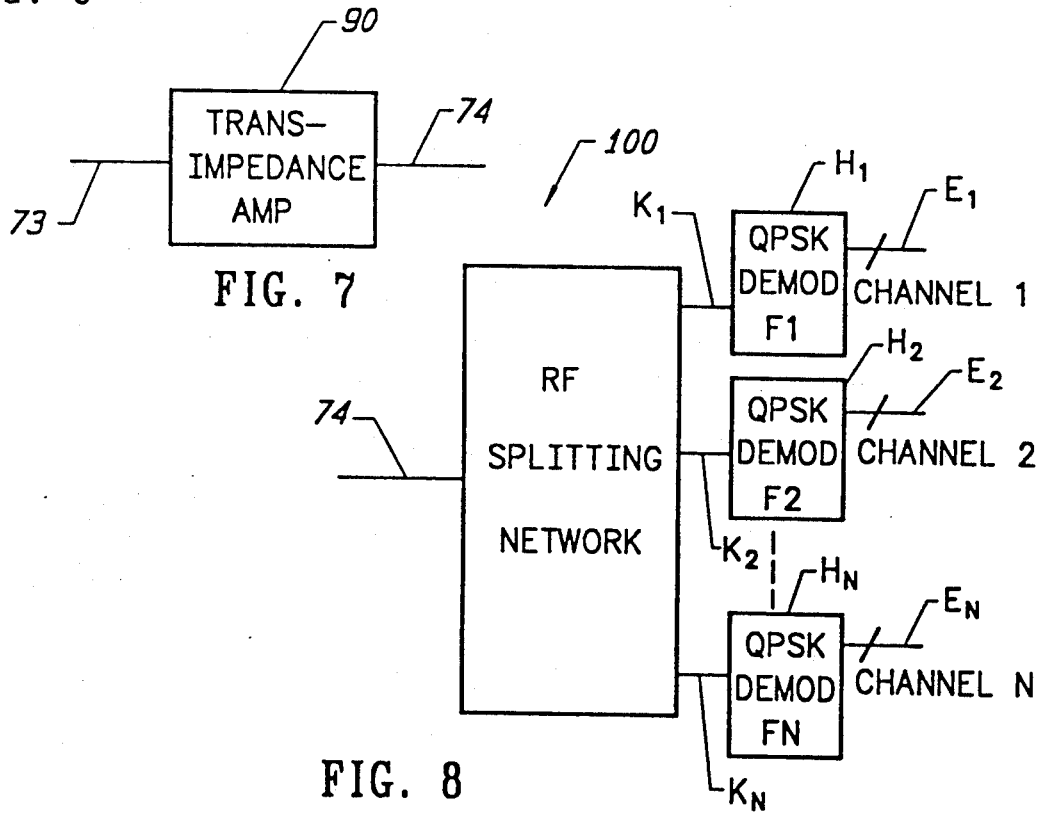
FIG. 8

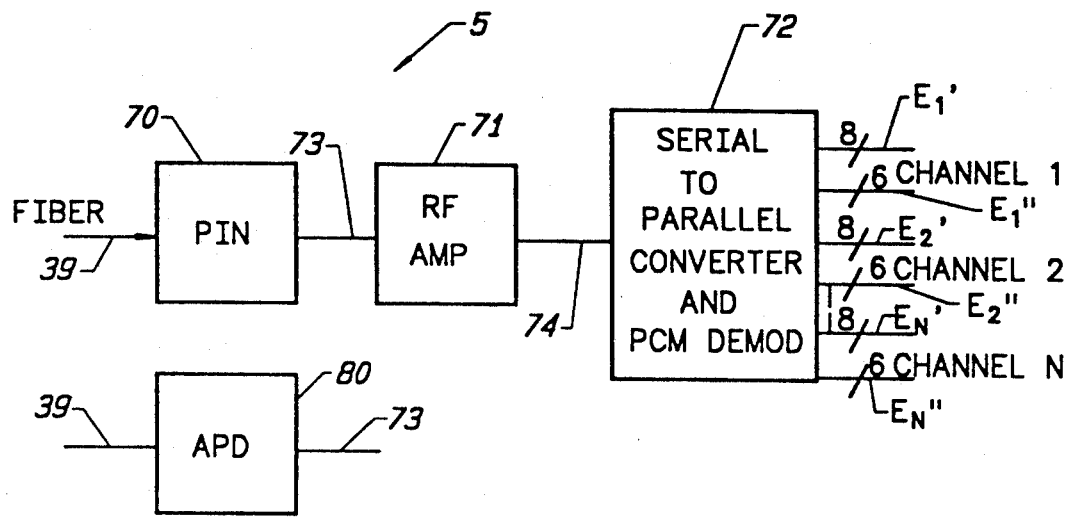
FIG. 20
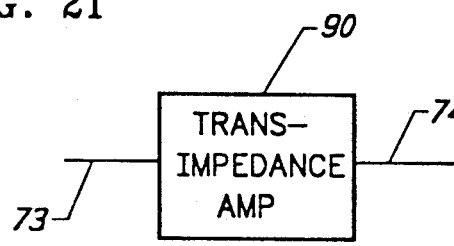
FIG. 21
FIG. 22
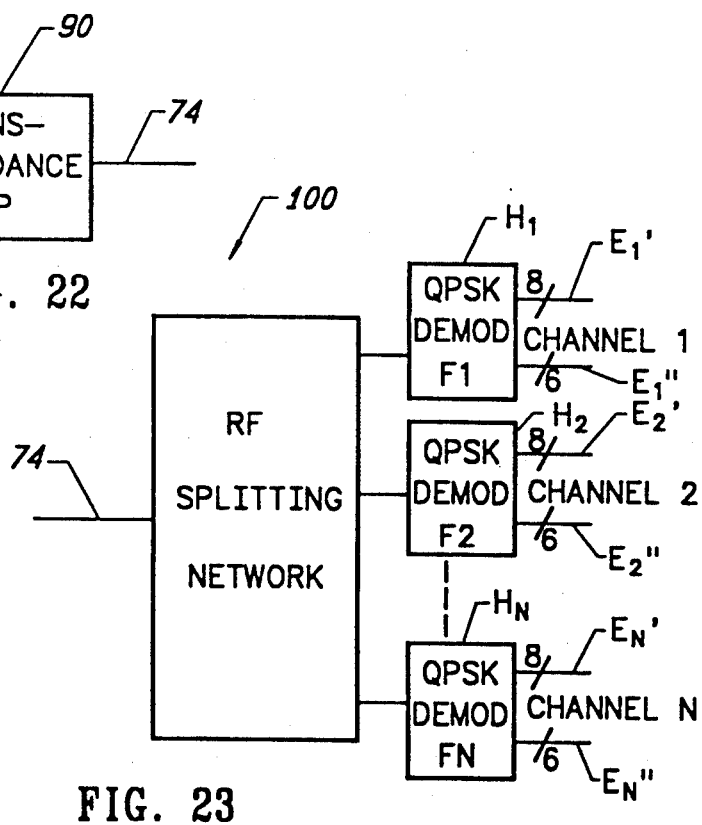
FIG. 23

SCRAMBLED VIDEO DIGITAL TRANSMISSION LINK

BACKGROUND OF THE INVENTION

1. Field of the Invention

The present invention relates to television (TV) signal transmission systems in general and in particular to an apparatus for transmitting scrambled video digital signals in a cable TV (CATV) system.

2. Description of the Prior Art

A typical CATV system comprises a headend station and, depending on its size, one or more hub stations for transmitting TV signals to the homes, offices, and the like, of individual subscribers.

A headend station is defined as a source of TV signals. The signals are typically transmitted from the headend station to one or more hub stations via fiber optic, coaxial and/or microwave transmission lines. The signals are transmitted from a hub station, usually by means of coaxial transmission lines, to the TV sets of individual subscribers and, in the case of large CATV systems, to other hub stations for distribution to its subscribers.

Conventional TV sets are designed to receive amplitude modulated (AM) video signals. The transmission of AM signals, however, suffers from poor performance due to decreasing signal-to-noise ratios which can become unacceptable over long transmission lines, e.g. longer than 5-10 kilometers.

To compensate for the signal-to-noise problem where long transmission lines exist between a headend station and a hub, a common practice has been to transmit FM video signals between the two. As is well known, such signals have a very high signal-to-noise ratio. When received in the hub, the signals are demodulated and then amplitude modulated for transmission to the TV sets connected thereto.

The scrambling of video signals is used in CATV systems to prevent the unauthorized viewing of certain TV programs or channels. While various methods may be used for scrambling a video signal, the most common method currently in use involves producing a radio frequency (r.f.) video signal by modulating the amplitude of a carrier signal by a baseband video signal which comprises video sync pulses, and then suppressing the video sync pulse in the amplitude modulated baseband r.f. video signal. In the TV set, sync circuits which are responsive to the sync pulses are used for synchronizing the TV to the transmitted video. If the sync pulses are suppressed, a descrambler is required in order to restore the pulse to the AM signal.

In systems providing scrambled video signals which must be transmitted over long distances, e.g. longer than 5-10 kilometers, FM signal processing has been used in an attempt to compensate for the reduced signal-to-noise ratios encountered. In practice, however, since the resulting FM modulation typically produces a modulation within a modulation due to the use of amplitude modulation in the scrambling process, the use of FM to compensate for the adverse effects on the signal-to-noise ratio resulting from the AM modulation is not found to be adequate.

In applicant's copending application Ser. No. 07/447,363, entitled Scrambled Frequency Modulated Video Signal Transmission System, assigned to the assignee of the present application, there is disclosed a system for transmitting scrambled FM modulated video signals from which the AM modulation has been removed before their transmission. This system seeks to eliminate the reduction in the signal-to-noise ratio associated with the transmission of AM modulated signals, i.e. signals comprising a modulation within a modulation, while preserving the advantages associated with transmitting purely FM modulated signals. While providing certain advantages, applicant's above-described system is relatively complex and therefore relatively costly to produce and maintain.

SUMMARY OF THE INVENTION

For the foregoing reasons, principle objects of the present invention are a novel method and apparatus for transmitting scrambled video signals over long distances which have a higher signal-to-noise ratio than found in prior known systems used for transmitting amplitude modulated video signals while retaining the advantages of applicant's previously described system.

In accordance with the present invention, there is provided a means for modulating the amplitude of a carrier signal by a baseband video signal comprising video sync pulses and then suppressing or otherwise scrambling the video sync pulses to obtain a conventional scrambled amplitude modulated video signal. An amplitude demodulator is then provided for removing the amplitude modulation from the scrambled amplitude modulated video signal producing what is conveniently called a scrambled video signal in a baseband format, or simply scrambled baseband.

In the sound signal processing portion of the system there is provided a means for up-converting the frequency of a sound signal comprising a subcarrier frequency to produce an r.f. sound intermediate frequency signal comprising the frequency of the carrier signal. At the same time as the sync pulse information is being suppressed in the video signal, it is used for modulating the amplitude of the sound intermediate frequency signal. The frequency of the amplitude modulated sound intermediate frequency signal is then down-converted to the subcarrier frequency and combined with the scrambled video signal in said baseband format. The resulting combined scrambled video and sound signals are then converted to a digital signal in a digital pulse code modulated (PCM) format or in a format produced by digital modulation of an r.f. carrier, such as quarternary phase shift keying (QPSK) techniques. The digital signal is then used to control the output of a transmitter. The transmitter preferably comprises a laser. The digital signal is used to either turn the laser on and off or is used for shifting the phase of an r.f. carrier which is in turn used for modulating the intensity of the output of the laser. The output of the laser is then transmitted via a fiber optic transmission line to a hub.

In the hub, the transmitted scrambled video and sound signals undergo a digital-to-analog conversion, amplitude modulation and frequency conversion to restore the original picture and sound intermediate frequency signals. These signals are then processed in a conventional IF-to-channel conversion network and transmitted to the TV sets of subscribers wherein they are descrambled and demodulated to produce the original baseband video and sound signals usable by the TV sets.

By removing the amplitude modulation from the video signal and placing the suppressed video sync pulse information on a sound subcarrier before the video and sound signals are transmitted, a high signal-to-noise ratio and the necessary sync pulse information required by the TV set are preserved.

BRIEF DESCRIPTION OF THE DRAWINGS

The above and other objects, features and advantages of the present invention will become apparent from the following detailed description of the accompanying drawings, in which:

FIG. 5 is a block diagram of a receiver according to the present invention;

FIG. 6 is a block diagram of an avalanche photodetector circuit for use in an alternative embodiment of the receiver of FIG. 5 according to the present invention;

FIG. 7 is a block diagram of a transimpedance amplifier for use in an alternative embodiment of the receiver of FIG. 5 according to the present invention;

FIG. 8 is a block diagram of a QPSK demodulating circuit and r.f. signal splitting network for use in an alternative receiver in conjunction with the apparatus of FIG. 4 according to the present invention;

FIG. 20 is a block diagram of a receiver used in the circuit of FIG. 17;

FIG. 21 is a block diagram of an avalanche photodetector used in an alternative embodiment of the receiver of FIG. 20;

FIG. 22 is a block diagram of a transimpedance amplifier used in another embodiment of the receiver of FIG. 20; and FIG. 23 is a block diagram of an r.f. signal splitting network and QPSK demodulating network used in still another embodiment of the receiver of FIG. 20.

DETAILED DESCRIPTION OF THE DRAWINGS

Figure 1:
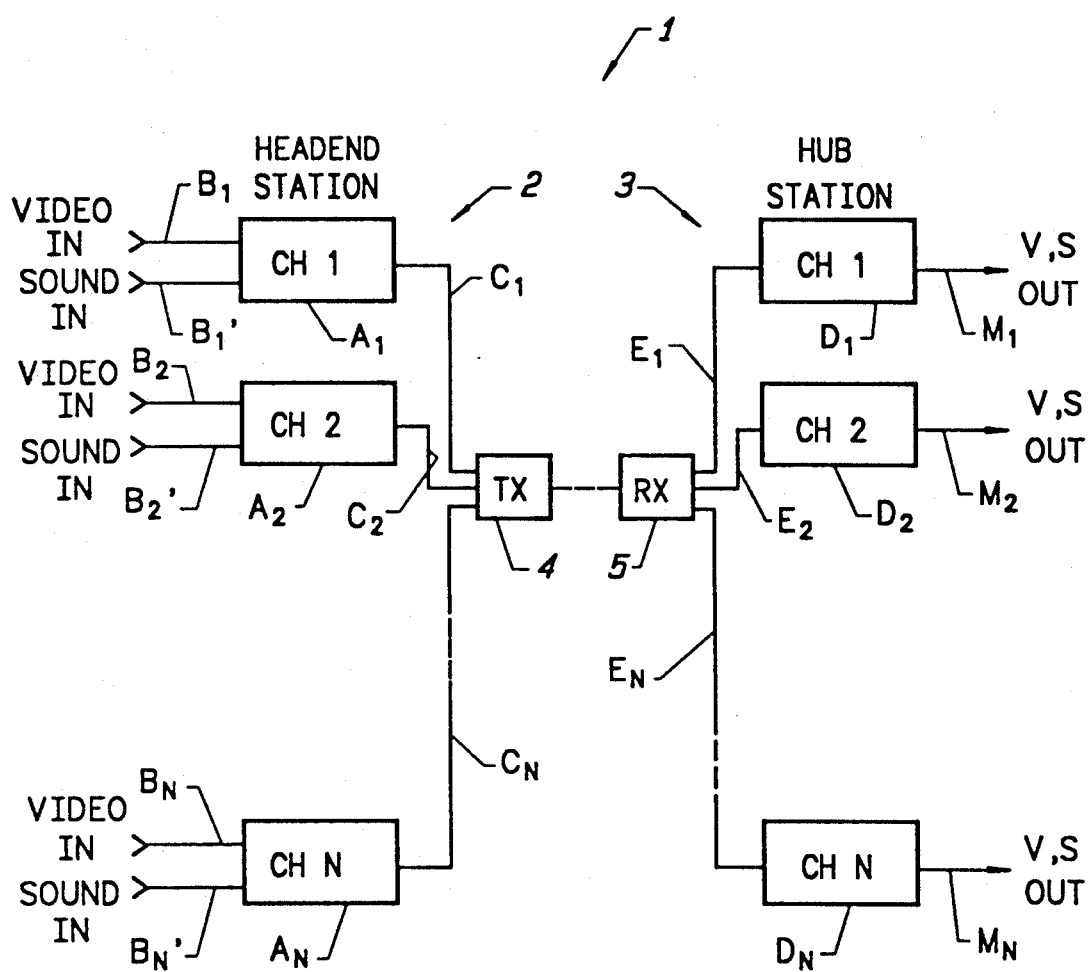
FIG. 1 is a block diagram of a multi-channel scrambled video digital transmission link according to the present invention.

Referring to FIG. 1, there is provided in accordance with the present invention a scrambled video digital transmission link designated generally as 1. In the transmission link 1 there is provided a headend station 2 and a hub station 3.

In the headend station 2 there is provided a plurality of circuits $A_1, A_2 \ldots A_n$. The circuits $A_1 \ldots A_n$ are provided with video signal input lines $B_1, B_2 \ldots B_n$ and sound signal input lines $B_1', B_2' \ldots B_n$ for processing video and sound signals associated with a plurality of channels CH 1, CH 2 ... CH N. The outputs of the circuits $A_1 \ldots A_n$ are provided to a transmitter 4, also designated TX, for transmission to a receiver 5, also designated RX, in the hub station 3 by means of a plurality of signal lines $C_1, C_2 \ldots C_n$.

In the hub station 3 there is provided a plurality of circuits $D_1, D_2 \ldots D_n$, which correspond to circuits $A_1 \ldots A_n$, for processing video and sound signals in the channels CH 1, CH 2 ... CH N and which are coupled to the receiver 5 by means of a plurality of signal lines $E_1, E_2 \ldots E_n$. Outputs from the circuits $D_1 \ldots D_n$ are provided on a plurality of signal lines $M_1, M_2 \ldots M_n$. As will be further described below, the circuits $D_1 \ldots D_n$ are provided for processing video and sound signals for distribution to the television (TV) sets of subscribers coupled to the hub station 3.

Figure 2:
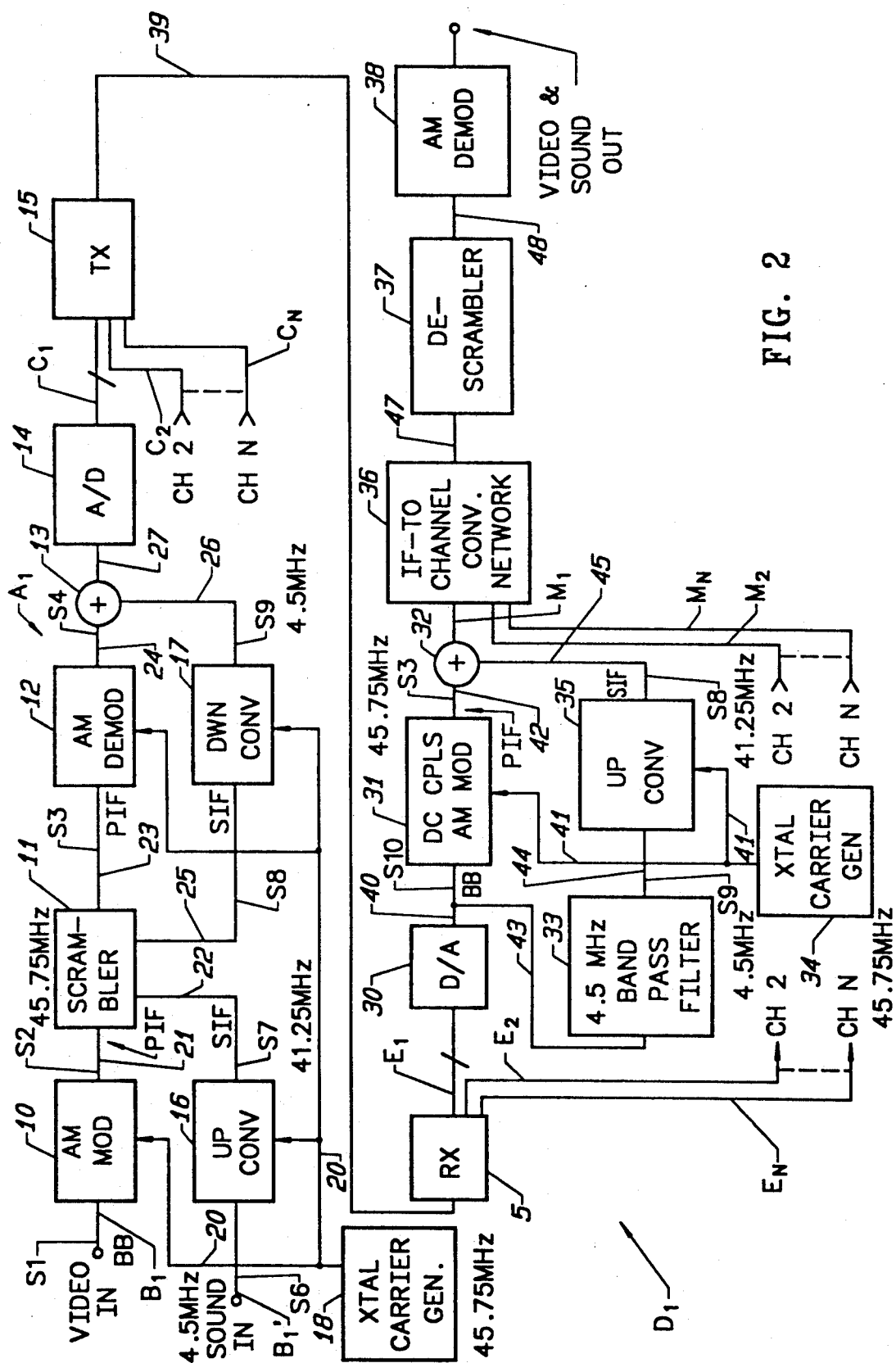
FIG. 2 is a more detailed block diagram of one of the channels in the scrambled video digital transmission link of FIG. 1.

Referring to FIG. 2, there is provided in the circuit $A_1$ and in each of the corresponding circuits $A_2 \ldots A_n$ in the headend station 2 which correspond respectively to channels CH 1 ... CH N, an amplitude modulator 10, a scrambler 11, an amplitude demodulator 12, a signal summing circuit 13, an analog-to-digital signal converting circuit 14, a transmitter circuit 15, an up-frequency converter 16, a down-frequency converter 17, and a crystal carrier signal generator 18.

The amplitude modulator 10 is provided with a first input coupled to the first video signal input line $B_1$ and a second input coupled to the crystal carrier signal generator 18 by means of a signal line 20. The crystal carrier signal generator 18 is provided for generating a carrier signal having a frequency of 45.75 megaHertz (MHz). The up-frequency converter 16 is provided with a first input coupled to the sound input signal line $B_1'$ and a second input coupled to the crystal carrier signal generator 18 by means of the signal line 20. The scrambler 11 is provided with a first input coupled to an output of the modulator 10 by means of a signal line 21 and a second input coupled to an output of the up-frequency converter 16 by means of a signal line 22. The amplitude demodulator 12 is provided with a first input coupled to a first output of the scrambler circuit 11 by means of a signal line 23 and a second input coupled to the crystal carrier signal generator 18 by means of the signal line 20 and an output coupled to a first input of the summing circuit 13 by means of a signal line 24. The down-frequency converter 17 is coupled to a second output of the scrambler circuit 11 by means of a signal line 25, a second input coupled to the crystal carrier signal generator 18 by means of the signal line 20 and an output coupled to a second input of the summing circuit 13 by means of a signal line 26. The summing circuit 13 is provided with an output coupled to an input of the analog-to-digital signal converting circuit 14 by means of a signal line 27. The output of the analog-to-digital signal converting circuit 14 is coupled to an input of the transmitter circuit 15 by means of the signal line $C_1$.

In the circuit $D_1$ and in each of the corresponding circuits $D_2 \ldots D_n$ in the hub station 3 there is provided the receiver 5, a digital-to-analog signal converting circuit 30, a dc coupled amplitude modulator 31, a signal summing circuit 32, a bandpass filter circuit 33, a crystal carrier signal generator 34, and an up-frequency converter circuit 35. Shown coupled to the output of the signal summing circuit 32 there is provided an intermediate frequency-to-channel conversion network 36, a descrambler circuit 37 and an amplitude demodulator 38. In conventional cable television systems, the intermediate frequency-to-channel conversion network 36 is generally located in the hub station, whereas the descrambler circuits 37 and amplitude demodulating circuits 38 are part of the television signal processing apparatus located in or adjacent to the television sets of each subscriber.

In the receiver 5 there is provided an input for receiving the television and sound signals from the transmitter 15. In a preferred embodiment of the present invention the signals from the transmitter 15 are transmitted to the receiver 5 by means of a fiber optic cable 39. As is apparent, cable 39 may also comprise a coaxial cable for transmitting electromagnetic r.f. video and sound signals or simply omitted in cases where r.f. signals are transmitted through the air from a transmitting antenna to a receiving antenna.

As indicated above, the receiver 5 is provided with a plurality of outputs coupled to the signal lines $E_1, E_2 \ldots E_n$. The digital-to-analog signal converting circuit 30 is coupled to the signal line $E_1$ and to the amplitude modulator 31 by means of a signal line 40. A second input of the modulator 31 is coupled to the crystal carrier signal generator 34 by means of a signal line 41. The output of the amplitude modulator 31 is coupled to the summing circuit 32 by means of a signal line 42.

The output of the digital-to-analog signal converter 30 is also coupled to the bandpass filter circuit 33 by means of a signal line 43. The output of bandpass filter 33 is coupled to the up-frequency converter circuit 35 by means of a signal line 44. A second input of the up-frequency converter 35 is coupled to the crystal carrier signal generator circuit 34 by means of the signal line 41. The output of the up-frequency converter circuit 35 is coupled to the signal summing circuit 32 by means of a signal line 45. The output of the signal summing circuit 32 is coupled to the intermediate frequency-to-channel conversion network 36 by means of the video and sound signal line $M_1$. The corresponding video and sound signals from the circuits $D_2 \ldots D_n$ are provided to the intermediate frequency to channel conversion network 36 by means of signal lines $M_2 \ldots M_n$.

Figure 3:
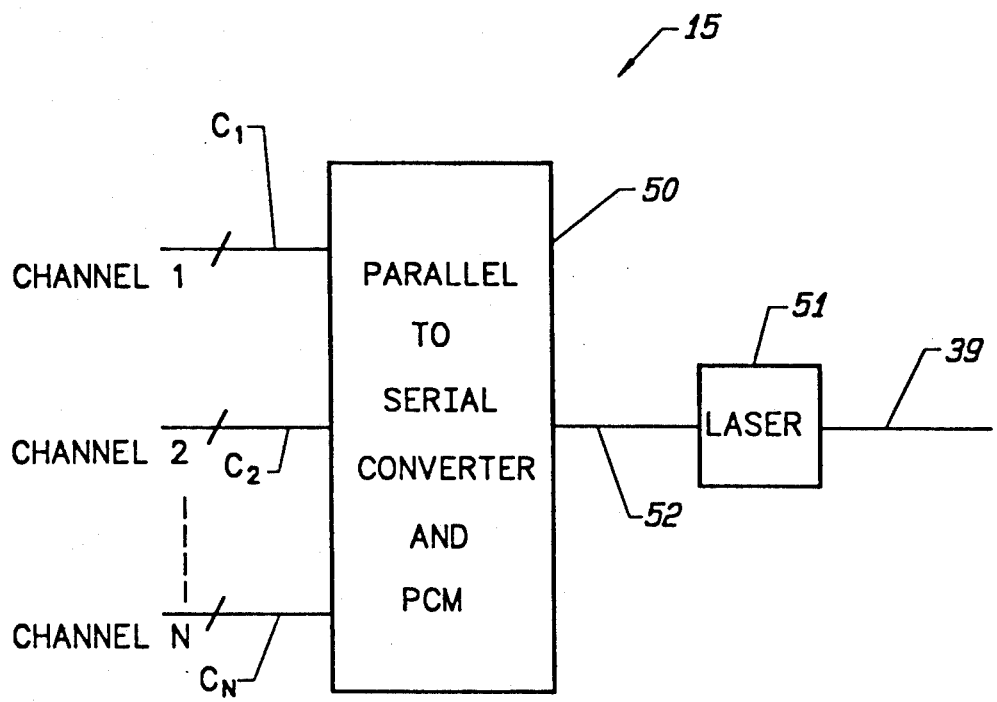
FIG. 3 is a block diagram of a parallel-to-serial converter and laser apparatus working in a time division multiplex mode (TDM) used in the transmitter of one of the embodiments of FIG. 2.

Referring to FIG. 3, there is provided in transmitter circuit 15 a parallel-to-serial converter and pulse code modulation (PCM) circuit 50 working in a time division multiplex mode (TDM), and a laser circuit 51. The circuit 50 is provided with a plurality of inputs for coupling the circuit 50 to the signal lines $C_1, C_2 \ldots C_n$. The output of the converter/modulator 50 is coupled to the laser circuit means 51 by means of a signal line 52. The output of the laser circuit means 51 is coupled to the fiber optic transmission cable 39.

Figure 4:
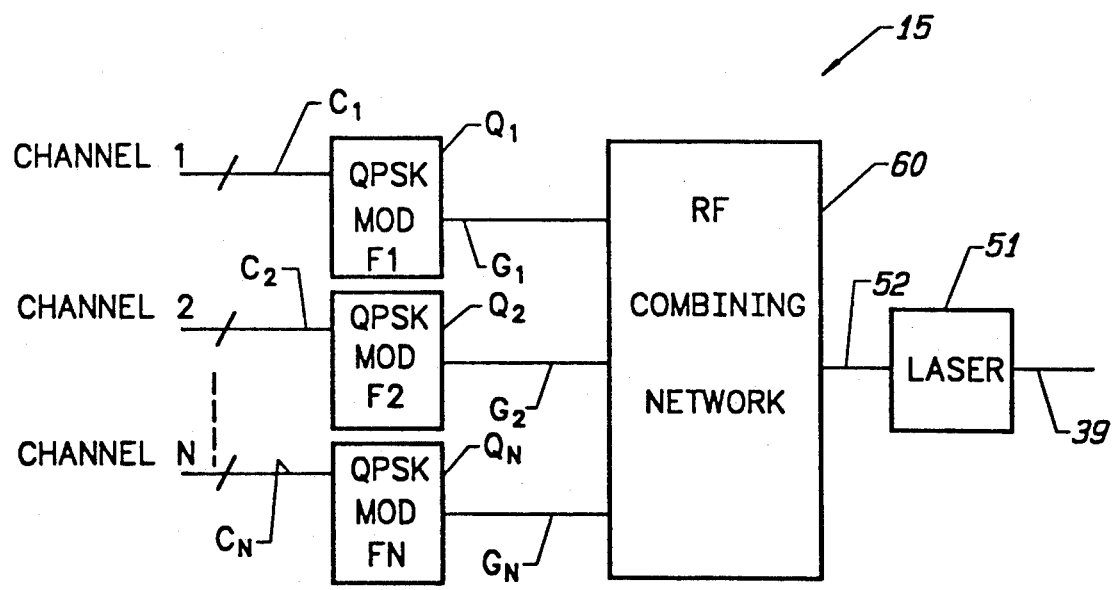
FIG. 4 is a block diagram of QPSK modulating, r.f. signal combining and laser apparatus used in an alternative embodiment of the transmitter of FIG. 2 according to the present invention.

Referring to FIG. 4, there is provided in an alternative embodiment of the transmitter circuit 15 a plurality of quarternary phase shift keying (QPSK) modulators $Q_1, Q_2 \ldots Q_n$. The inputs of the modulators $Q_1 \ldots Q_n$ are coupled respectively to the signal lines $C_1 \ldots C_n$. The outputs of the modulators $Q_1 \ldots Q_n$ are coupled to an r.f. signal combining network 60 by means of a plurality of signal lines $G_1, G_2 \ldots G_n$. The output of the r.f. combining network 60 is coupled to the laser circuit means 51 by means of the signal line 52. The output of the laser circuit means 51 is coupled to the receiver 5 by means of the fiber optic transmission line 39.

Referring to FIG. 5, there is provided in the receiver circuit 5 a reverse bias PIN diode circuit 70 for converting light signals to current signals, an r.f. amplifier 71 and a serial-to-parallel signal converter and pulse code demodulator circuit 72. Circuit 70 is coupled to the fiber optic transmission line 39 and has an output coupled to the r.f. amplifier circuit 71 by means of a signal line 73. The output of the r.f. amplifier circuit 71 is coupled to the converter/demodulator 72 by means of a signal line 74. The circuit 72 is provided with a plurality of outputs for coupling the circuit 72 to the signal lines $E_1, E_2 \ldots E_n$, respectively.

Referring to FIG. 6, there is provided for use in an alternative embodiment of the receiver 5 of FIG. 5 an avalanche photodetector circuit 80. Circuit 80 is provided for converting light signals into current signals with gain and may be used in place of the PIN diode circuit 70 which also converts light signals into current signals but without gain.

Referring to FIG. 7, there is provided in still another embodiment of the present invention a transimpedance amplifier 90 which may be used in place of the r.f. amplifier 71 of FIG. 5. Accordingly, amplifier 90 has an input for coupling the amplifier to the signal line 73 and an output for coupling the amplifier to the signal line 74. Typically, the r.f. amplifier 71 is used as a matching amplifier and comprises a 50 ohm input impedance and a 50 ohm output impedance. On the other hand, the transimpedance amplifier 90 may be used for providing an output voltage as a function of input current according to the equation $V_{OUT}=KI_{IN}$, where K is a constant.

Referring to FIG. 8, there is provided in still another embodiment of a receiver according to the present invention a radio frequency splitting network 100 having an input for coupling to the signal line 74 of the circuit of FIG. 5, and a plurality of QPSK demodulating circuits $H_1, H_2 \ldots H_n$. Circuits $H_1 \ldots H_n$ are coupled to the network 100 by means of a plurality of signal lines $K_1, K_2 \ldots K_n$. The outputs of the demodulating circuits $H_1 \ldots H_n$ are provided to the signal lines $E_1, E_2 \ldots E_n$.

In practice, the circuits of FIGS. 6 and 7 can be used in any of the embodiments of the receiver 5. However, the circuit 72 of FIG. 5 is intended to be used with the transmitter circuit of FIG. 3 and the circuit of FIG. 8 is intended to be used with the transmitter circuit of FIG. 4.

FIGS. 9-16 comprise drawings of a plurality of signals which can be found at various points in the apparatus of FIG. 2 and which will be referred to in the following description of the operation of the apparatus of FIG. 2.

Figure 9:
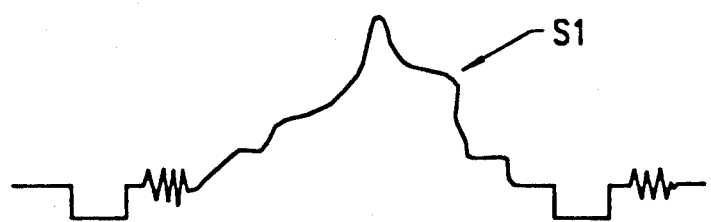
FIG. 9 is a drawing of a baseband video signal applied to the input of the amplitude modulator in the headend section of FIG. 2.
Figure 10:
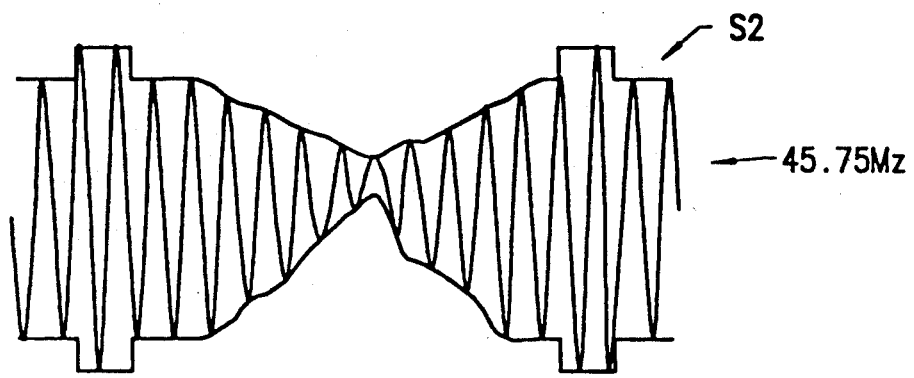
FIG. 10 is a diagram of a picture intermediate frequency signal produced at the output of the amplitude modulator in the headend section of FIG. 2.
Figure 11:
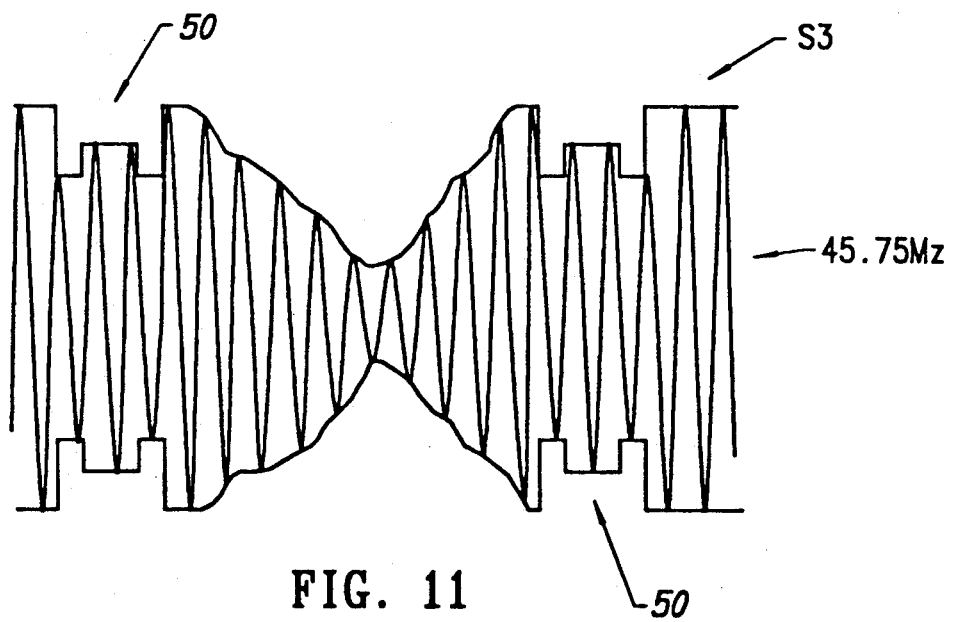
FIG. 11 is a diagram of a scrambled picture intermediate frequency signal produced at a first output of the scrambler of FIG. 2.
Figure 13:
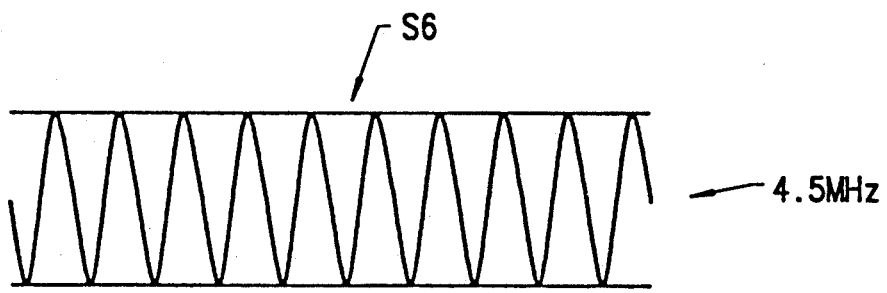
FIG. 13 is a diagram of the r.f. sound signal comprising an r.f. subcarrier frequency applied to the input of the upconverters of the circuit of FIG. 2.
Figure 14:
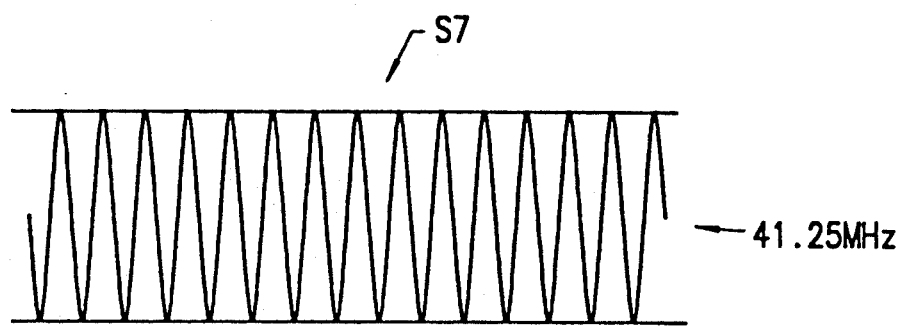
FIG. 14 is a diagram of the r.f. sound signal comprising an upconverted carrier frequency which appears on the output of the upconverters of the circuit of FIG. 2.

Referring again to FIG. 2, in the operation of the circuit $A_1$ in channel CH 1, as well as circuits $A_2 \ldots A_n$ in channels CH 2 ... CH N, a baseband video signal S1, as shown in FIG. 9, is applied to the signal line $B_1$ at the input of the amplitude modulator 10. In the amplitude modulator 10, the signal S1 amplitude modulates the carrier signal from the carrier signal generator 18, producing a picture intermediate frequency (PIF) signal S2 comprising an amplitude modulated carrier signal as shown in FIG. 10. As indicated above, the frequency of the carrier signal is 45.75 MHz. In synchronism with the video signal applied to the input signal line $B_1$, there is provided on the input signal line $B_1'$ at the input to the up-frequency converter 16 a frequency modulated sound signal S6 as shown in FIG. 13 comprising a nominal carrier frequency of 4.5 MHz. The up-frequency converter 16 increases the frequency of the carrier signal to produce a sound intermediate frequency (SIF) signal S7 having a nominal carrier frequency of 41.25 MHz as shown in FIG. 14.

Figure 15:
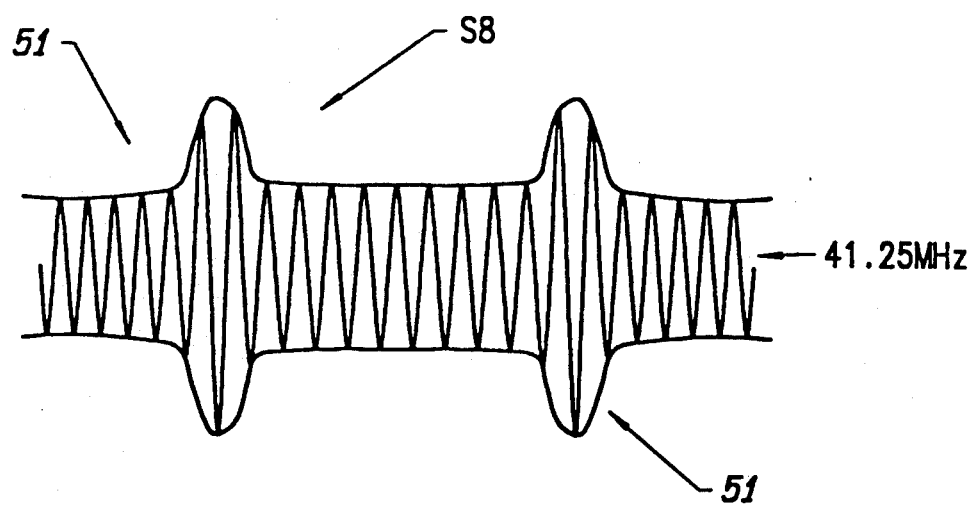
FIG. 15 is a diagram of the amplitude modulated sound intermediate frequency signal appearing at a second output of the scrambler of the circuit of FIG. 2.

The signals S2 and S7 are applied to the first and second inputs of the scrambler circuit 11. The scrambler circuit 11 provides on its first output signal line 23 a scrambled picture intermediate frequency signal S3 having a suppressed sync pulse as shown at 50 in FIG. 11 and on its second output signal line 25 a modified sound intermediate frequency comprising an amplitude modulated sound signal S8 as shown in FIG. 15. The operation of the scrambler 11 to produce the signals S3 and S8 is conventional. As is well known, conventional scramblers typically suppress the video sync pulse and in so doing, modify the sound signals associated therewith to incorporate the video sync pulse information for use in descrambler circuits to restore the video sync pulse in the video sync signal. For example, the modification of the sound signal may take the form of an amplitude modulation as shown at 51 in FIG. 15. However, it should be noted that an important feature of the present invention is that it may be used with any type of scrambling and, indeed, the actual structure and operation of the scrambler need not be known so long as it accepts the inputs described and provides outputs which can be used in the following circuits 12 and 17.

Figure 12:
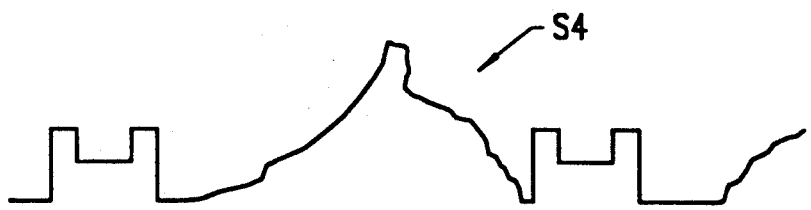
FIG. 12 is a diagram of a scrambled video signal in a baseband format with the video sync pulse information suppressed which appears at the output of the amplitude demodulator of FIG. 2.
Figure 16:
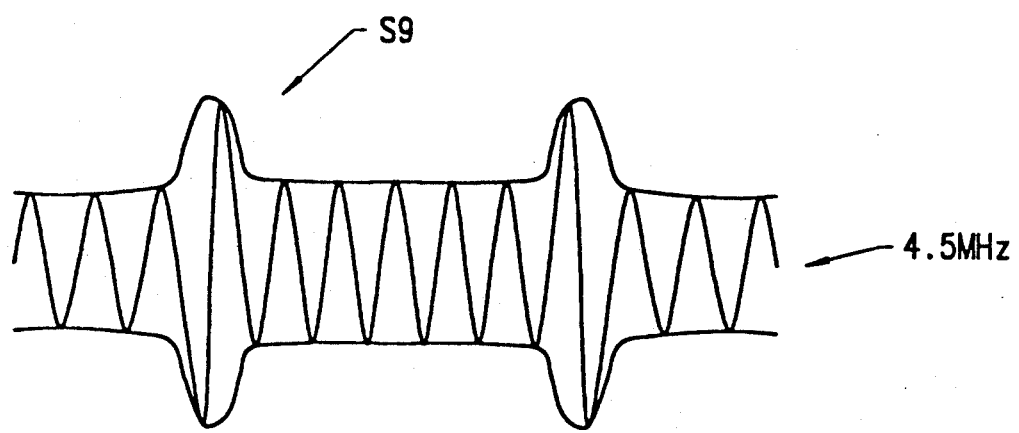
FIG. 16 is a diagram of the sound intermediate frequency signal comprising the subcarrier frequency which appears at the output of the downconverter of the circuit of FIG. 2.

The signal S3 is then applied to the input of the amplitude demodulator 12 to produce on the output thereof in combination with the carrier signal applied to the second input of the demodulator 12, a scrambled video signal in a baseband format, or what may be conveniently called a scrambled baseband video signal S4 as shown in FIG. 12. At the same time, the frequency of the modified sound intermediate frequency signal S8 which comprises a nominal carrier frequency of 41.25 MHz is down converted in conjunction with the carrier signal to produce a modified sound signal S9 having a nominal carrier frequency of 4.5 MHz as shown in FIG. 16.

The signals S4 and S9 are then summed in the summing circuit 13 and applied to the input of the analog-to-digital converting circuit 14 for producing on the output of the circuit 14 a corresponding digital signal comprising both scrambled video and sound information. The signal from the analog-to-digital converting circuit 14 is then transmitted to the transmitter 15 by means of the signal line $C_1$. Of course, the digital video and sound signals associated with each of the other channels CH 2 ... CH N are coupled to the transmitter 15 by means of the signal lines $C_2 \ldots C_n$.

Referring again to FIG. 3, the apparatus shown in FIG. 3 is used for modulating the output of the laser means 51. As the digital signals from the analog-to-digital converting circuits 14 in each of the channels CH 1 ... CH N is received by the transmitter 15, they are converted from a plurality of parallel signals to a serial signal and used to turn the laser 51 on and off in a digital pulse code modulation format. The resulting output of the laser is then transmitted via the fiber optic transmission line 39 to the receiver 5 in the hub station 3.

Referring to FIGS. 5 and 6, the digital output of the laser 51 is received by either the PIN diode 70 of FIG. 5 or the avalanche photodetector 80 of FIG. 6. Both the PIN diode 70 and the avalanche photodetector 80 convert the light signals into current signals. The current signals are then amplified in either the r.f. amplifier 71 of FIG. 5 or a transimpedance amplifier 90 as shown in FIG. 7. Thereafter, the serial digital signals are converted to parallel digital signals in the circuit 72 and output on signal lines $E_1, E_2 \ldots E_n$.

Referring again to FIG. 2, the digital output signal of the receiver 5 in each of the channels CH 1 ... CH N, e.g. the signal on line $E_1$, is converted in the digital-to-analog converting circuit 30 to produce on the output thereof a complex analog signal S10 comprising a composite of the scrambled baseband video signal S4 and the down converted audio signal S9 described above with respect to the outputs of the summing circuit 13 and FIGS. 12 and 16. The signal S10 is then applied to the dc coupled amplitude modulator 31 and to the bandpass filter circuit 33 having a center frequency of 4.5 MHz. In the modulator 31 the amplitude of the signal S10 is modulated to produce an amplitude modulated composite video and sound signal including the picture intermediate frequency signal S3 described above with respect to FIG. 11. The bandpass filter 33 filters the sound signal S10 from the output of the digital-to-analog converting circuit 30 to recreate the modified sound signal S9 having the nominal center frequency of 4.5 MHz as described above with respect to FIG. 16. The frequency of the signal S9 is then up converted by the up frequency converter 35 to recreate the modified sound intermediate frequency S8 described above with respect to FIG. 15 having a nominal center frequency of 41.25 MHz. The resulting signals S3 and S8 are then summed in the summing circuit 32 and applied to the intermediate frequency-channel-conversion network 36 together with the corresponding signals from the other channels CH 2 ... CH N.

Referring again to FIGS. 4 and 8, in an alternative embodiment of the present invention, the signals on the signal lines $C_1 \ldots C_n$ from the analog-to-digital converting circuits 14 in each of the channels CH 1 ... CH N may be used for modulating a plurality of carriers $F_1, F_2 \ldots F_n$ in the QPSK modulating circuits $Q_1 \ldots Q_n$ in a conventional manner. These signals are then combined in the r.f. combining network 60 of FIG. 4 and used to modulate the intensity of the output of the laser 51. In the receiver 5 according to the embodiment of FIG. 8, the r.f. splitting network 100 and the QPSK demodulators $H_1 \ldots H_n$ are used to split and demodulate the signals in a conventional manner to produce corresponding digital signals on the signal lines $E_1 \ldots E_n$ associated with each of the channels CH 1 ... CH N.

Figure 17:
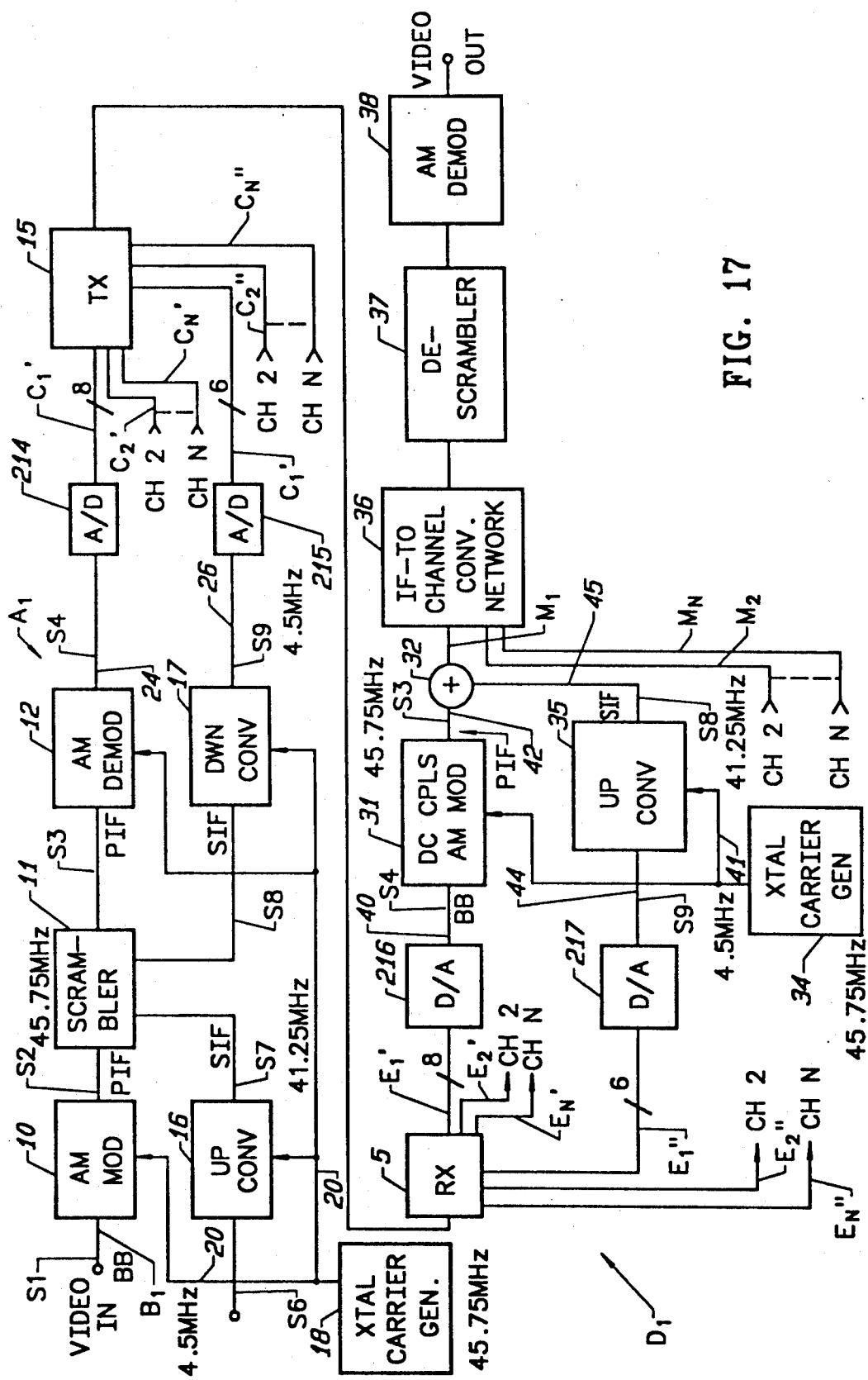
FIG. 17 is a block diagram of an alternative embodiment of the present invention wherein dual analog-to-digital converters and dual digital-to-analog converters are used in the headend and hub sections of the circuit of FIG. 2.

Referring to FIG. 17, there is shown an alternative embodiment of the present invention in which the summing circuit 13 and analog-to-digital converter circuit 14 in the circuit $A_1$ and all corresponding circuits $A_2 \ldots A_n$ for channels CH 2 ... CH N in the headend station 2 are replaced by a pair of analog-to-digital converters 214 and 215 and the digital-to-analog converter 30 and the bandpass filter 33 in the circuit $D_1$ and all corresponding circuits $D_2 \ldots D_n$ in channels CH 2 ... CH N in the hub station 3 are replaced by a pair of digital-to-analog converters 216 and 217. In this embodiment, the analog-to-digital converter 214 comprises an 8-bit analog-to-digital converter and the analog-to-digital converter 215 comprises a 6-bit analog-to-digital converter. Six bits can be used in the sound signal processing leg of the circuit because a higher amount of quantization noise than is acceptable in the video signal processing leg is tolerable in the sound leg.

In the embodiment of FIG. 17, the output signal line 24 from the amplitude demodulator 12 is coupled to the analog-to-digital converter 214. The output of the converter 214 is provided to the transmitter 15 on an 8 bit lines $C_1'$. Corresponding digital video signals from corresponding digital converters 214 in channels CH 2 ... CH N are provided to transmitter 15 on corresponding video signal 8 bit lines $C_2' \ldots C_n'$. Similarly, the output of down-frequency converter 17 is coupled to analog-to-digital converter 215 by the sound signal line 26. The output of the converter 215 and the outputs of all of the corresponding converters 215 in the circuits for channels CH 2 ... CH N are provided on corresponding 6 bit digital signal lines $C_1'' \ldots C_n''$.

The receiver 5 in the circuit $D_1$ and all corresponding circuit $D_2 \ldots D_n$ in the apparatus of FIG. 17 is also modified to separate the video and sound signals. Accordingly, the video signals from receiver 5 are transmitted to the digital-to-analog converter 216 in circuit $D_1$ and all corresponding circuits $D_2 \ldots D_n$ by means of a plurality of 8 bit lines $E_1', E_2' \ldots E_n'$ and the sound signals from receiver 5 are transmitted to digital-to-analog converter 217 in circuit $D_1$ and all corresponding circuits $D_2 \ldots D_n$ by means of a plurality of sound signal 8 bit lines $E_1'', E_2'' \ldots E_n''$. In the converter 216 the signals from receiver 5 are converted to analog signals and provided to the dc coupled amplitude modulator 31 by means of the signal line 40. The analog signals from the converter 217 are provided to the up-frequency converter 35 by means of the signal line 44.

Figure 18:
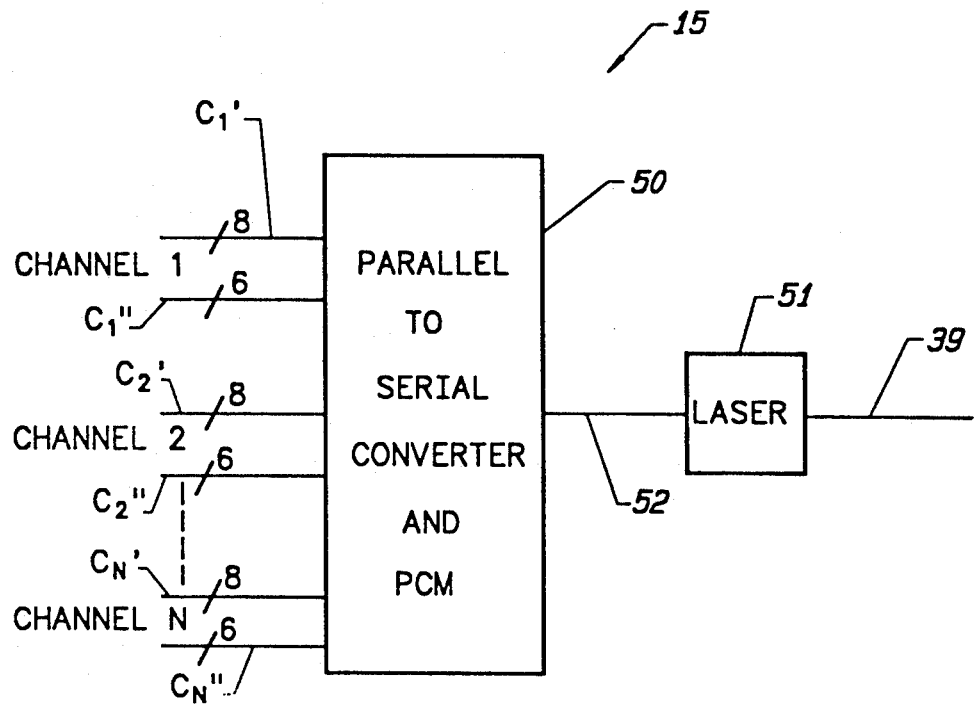
FIG. 18 is a block diagram of a parallel-to-serial converter and laser circuit used in the transmitter of the circuit of FIG. 17.
Figure 19:
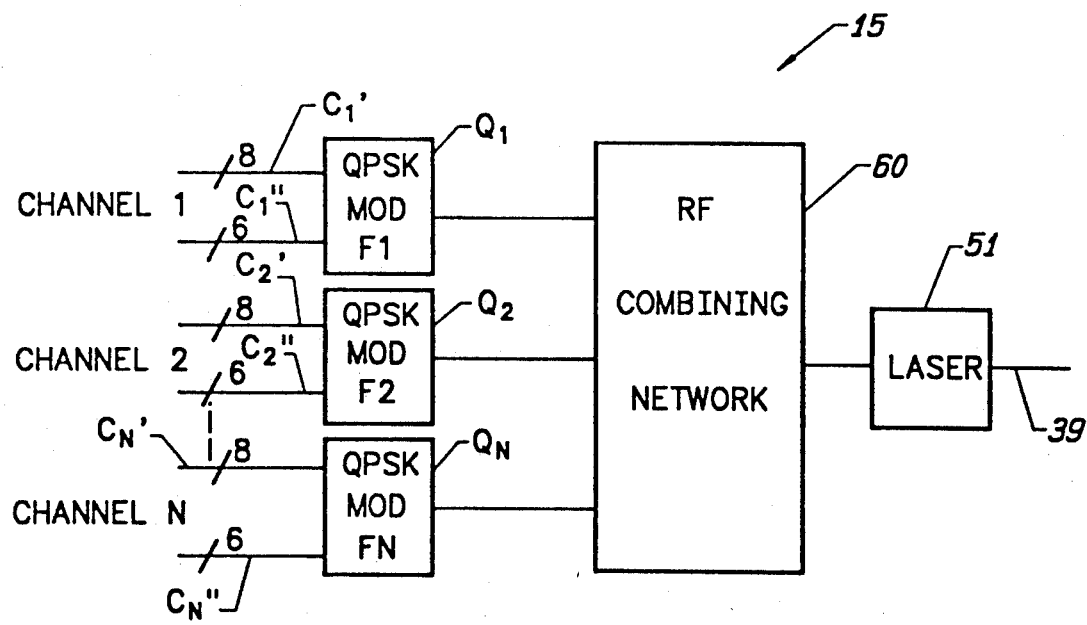
FIG. 19 is a block diagram of a QPSK modulator and r.f. signal combining network and laser apparatus used in an alternate embodiment of the transmitter of FIG. 17.

Referring to FIGS. 18–23, the transmitter circuits of FIGS. 18 and 19 and the receiver circuits of FIGS. 20–23 are substantially identical to the transmitter circuits of FIGS. 3 and 4 and the receiver circuits of FIGS. 5–8 described above, with the following exceptions. The parallel-to-serial converter 50 of FIG. 18 is provided with a means for converting the signals on the 8 bit signal lines $C_1' \ldots C_n'$ and the signals on the 6 bit signal lines $C_1'' \ldots C_n''$ to serial signals. The QPSK modulators $Q_1 \ldots Q_n$ in the apparatus of FIG. 19 is further provided with means for modifying carrier frequencies $F_1 \ldots F_n$ received on the signal lines $C_1' \ldots C_n'$ and $C_1'' \ldots C_n''$. The various embodiments of receiver 5 shown in FIGS. 20–23 are similarly modified so as to provide on the output of the serial-to-parallel converter 72 of FIG. 20 video and sound signals on the signal lines $E_1' \ldots E_n'$ and $E_1'' \ldots E_n''$, respectively. Likewise, the QPSK demodulators $H_1 \ldots H_n$ of the apparatus of FIG. 3 is provided with means for providing video and digital signals at their outputs on 8 bit signal lines $E_1' \ldots E_n'$ and on 6 bit signal lines $E_1'' \ldots E_n''$, respectively. In all other respects, the embodiments of FIGS. 17–23 operate in substantially the same manner as the embodiments of FIGS. 2–8.

A very important feature of the present invention that should be noted is that, while the invention is described as using a conventional scrambler for suppressing video sync pulses and modifying audio signals to include the suppressed sync pulse information, it is not necessary to know exactly how the scrambling is done because clamping methods are not used to restore the dc level as is done in conventional descrambling circuits. Or put another way, the picture intermediate frequency, i.e. the scrambled video signal and the sound intermediate frequency, i.e. modified sound signal, generated at the output of the scrambler 11 in the headend station circuits $A_1 \ldots A_n$ are reproduced at the output of the amplitude modulator 31 and up-frequency converter 35 in the circuits $D_1 \ldots D_n$ in the hub station 3 without regard to the manner in which these signals were generated. Of course, as previously discussed, a no less important feature of the invention is that the amplitude modulation of the scrambled video signals is removed to produce a scrambled video signal in a baseband format before it is transmitted to the hub station, thereby maintaining a high signal-to-noise ratio for the signal.

While preferred embodiments of the present invention are described above, it is contemplated that various modifications may be made thereto without departing from the spirit and scope of the present invention. Accordingly, it is intended that the embodiments described be considered only as illustrative of the present invention and that the scope thereof should not be limited thereto but be determined by reference to the claims hereinafter provided and their equivalents.

What is claimed is:

1. A scrambled video digital transmission link comprising:
   means responsive to a baseband video signal for providing a scrambled video signal in a baseband format;
   means for converting a scrambled video signal in said baseband format into a digital video signal; and
   transmitting means for transmitting an output signal corresponding to said digital signal.

2. A scrambled video digital transmission link according to claim 1 wherein said means for providing said scrambled video signal in said baseband format comprises:
   amplitude modulating means responsive to said baseband video signal for providing a picture intermediate frequency signal;
   scrambling means responsive to said picture intermediate frequency signal for providing a scrambled picture intermediate frequency signal; and
   amplitude demodulating means responsive to said scrambled picture intermediate frequency signal for providing said scrambled video signal in said baseband format.

3. A scrambled video digital transmission link according to claim 1 comprising receiving means responsive to said output signal from said transmitting means for producing an output signal comprising said scrambled video signal in said baseband format.

4. A scrambled video digital transmission link according to claim 3 wherein said output signal from said transmitting means comprises a digital signal and said receiving means responsive to said output signal from said transmitting means comprises digital-to-analog signal converting means for converting said digital signal to an analog signal.

5. A scrambled video digital transmission link according to claim 4 wherein said receiving means responsive to said output signal from said transmitting means comprises means responsive to said analog signal from said digital-to-analog converting means for modulating the amplitude of said analog signal.

6. A scrambled video digital transmission link according to claim 1 wherein said transmitting means comprises:
   laser means; and
   means coupled to said video digital signal providing means for controlling the output of said laser means.

7. A scrambled video digital transmission link according to claim 6 wherein said means for controlling the output of said laser means comprises means for turning said laser means on and off.

8. A scrambled video digital transmission link according to claim 7 comprising a plurality of channels of digital video signals and wherein said means for turning said laser means on and off comprises parallel-to-serial signal converting means for converting a plurality of parallel video signals from said plurality of channels to a serial signal.

9. A scrambled video digital transmission link according to claim 6 wherein said means for controlling the output of said laser means comprises means for modulating the intensity of the output of said laser means.

10. A scrambled video digital transmission link according to claim 9 wherein said means for modulating the intensity of the output of said laser means comprises means for modulating an r.f. carrier signal.

11. A scrambled video digital transmission link according to claim 10 wherein said means for modulating said r.f. carrier signal comprises quarternary phase shift keying means.

12. A scrambled video digital transmission link according to claim 10 comprising a plurality of channels of digital video signals and wherein said means for modulating said r.f. carrier signal comprises a plurality of quarternary phase shift keying means coupled to said channels and r.f. signal combining means coupled to said plurality of quarternary phase shift keying means for combining the outputs of said plurality of quarternary phase shift keying means.

13. A scrambled video digital transmission link according to claim 1 comprising:
   means responsive to a sound signal comprising a first subcarrier frequency for providing a sound intermediate frequency signal having a second subcarrier frequency;
   means responsive to said sound intermediate frequency signal having said second subcarrier frequency for providing a modified sound intermediate frequency signal having said second subcarrier frequency, said modified sound intermediate frequency signal having said second subcarrier frequency comprising video sync information for use in descrambling said scrambled video signal; and
   means responsive to said modified sound intermediate frequency signal having said second subcarrier frequency for providing a digital sound signal; and
   wherein said transmitting means comprises:
   laser means; and
   means coupled to said digital video signal providing means and said digital sound signal providing means for controlling the output of said laser means.

14. A scrambled video digital transmission link according to claim 13 wherein said digital video and said digital sound signals are generated in parallel and said means for controlling the output of said laser means comprises:
   means for converting said parallel digital video and digital sound signals to serial digital video and digital sound signals for turning said laser means on and off.

15. A scrambled video digital transmission link according to claim 13 wherein said digital video and said digital sound signals are generated in parallel and said means for controlling the output of said laser means comprises:
   means responsive to said digital video and said digital sound signals for modulating the intensity of the output of said laser means.

16. A scrambled video digital transmission link according to claim 15 wherein said means for modulating the intensity of the output of said laser means comprises a quarternary phase shift keying means having parallel inputs for receiving said parallel digital video and digital sound signals.

17. A scrambled video digital transmission link comprising:
   a) a plurality of channels, each of said channels including
      i) first means responsive to a baseband video signal for providing a scrambled video signal in a baseband format,
      ii) second means responsive to said first means for providing a digital video signal corresponding to said scrambled video signal in said baseband format,
      iii) means responsive to a sound signal for providing a sound intermediate frequency signal,
      iv) means responsive to said sound intermediate frequency signal for providing a modified sound intermediate frequency signal, said modified sound intermediate frequency signal comprising video sync information for use in descrambling said scrambled video signal; and
      v) means for converting a scrambled video signal in said baseband format and said modified sound intermediate frequency signal into a digital signal;
   b) transmitting means responsive to said digital signal for transmitting an output signal corresponding to said digital signal; and
   c) receiving means responsive to said output signal form said transmitting means for re-creating said scrambled video signal in said baseband format and said modified sound signal.

18. A scrambled video digital transmission link comprising:
   first carrier signal generating means for generating a first carrier signal having a first carrier frequency;
   first amplitude modulating means responsive to a baseband video input signal and said first carrier signal for providing a first picture intermediate frequency signal comprising said first carrier frequency;

first up-converting means responsive to a sound signal having a subcarrier frequency and said first carrier signal for providing a first sound intermediate frequency signal having a frequency equal to the difference between said first carrier frequency and said subcarrier frequency;

a scrambling circuit means responsive to said first picture intermediate frequency signal and said first sound intermediate frequency signal for providing a first scrambled picture intermediate frequency signal and a first modified sound intermediate frequency signal, and first modified sound intermediate frequency signal comprising video sync information and said first carrier frequency;

amplitude demodulating means responsive to said first scrambled picture intermediate frequency signal and said first carrier signal for providing a scrambled video signal in said baseband format;

a down-converting means responsive to said first modified sound intermediate frequency signal and said first carrier signal for providing a second modified sound signal comprising said video sync information and said subcarrier frequency;

analog-to-digital converting means responsive to said scrambled video signal in said baseband format and said second modified sound signal for providing a digital signal thereof, said digital signal comprising a digital version of said scrambled video signal in said baseband format and said second modified sound signal;

transmitting means for converting a digital signal from said analog-to-digital converting means into an output signal;

receiving means responsive to said output signal from said transmitting means for recreating said digital signal;

digital-to-analog converting means responsive to said digital signal from said receiving means for providing an analog signal thereof, said analog signal comprising an analog version of said scrambled video signal in said baseband format and said second modified sound signal;

second carrier signal generating means for generating a second carrier signal comprising a second carrier frequency;

second amplitude modulating means responsive to said scrambled video signal in said baseband format from said digital-to-analog converting means and said second carrier signal for providing a second scrambled picture intermediate frequency signal comprising said second carrier frequency;

second up-converting means responsive to said second modified sound signal from said digital-to-analog converting means for providing a third modified sound signal comprising said video sync information and a frequency equal to the difference between said second carrier frequency and said subcarrier frequency; and summing means responsive to said scrambled picture intermediate frequency signal from said second amplitude modulating means and said modified sound signal from said second up-converting means for providing an output signal corresponding to the sum of said signals applied to said summing means.

19. A scrambled video digital transmission link according to claim 18 wherein said first and said second carrier frequencies are substantially the same.

20. A scrambled video digital transmission link according to claim 18 wherein said analog-to-digital converting means comprises:
a first analog-to-digital converting means responsive to said scrambled video signal in said baseband format from said amplitude demodulating means for providing a first digital signal comprising a digital version of said scrambled video signal in said baseband format; and
a second analog-to-digital converting means responsive to said second modified sound signal from said down-converting means for providing a second digital signal comprising a digital version of said second modified sound signal.

21. A scrambled video digital transmission link according to claim 18 wherein said digital-to-analog converting means comprises:
a first digital-to-analog converting means responsive to said digital signal from said receiving means for providing an analog version of said scrambled video signal in said baseband format; and
a second digital-to-analog converting means responsive to said digital signal from said receiving means for providing an analog version of said second modified sound signal.

22. A scrambled video digital transmission link according to claim 18 wherein said transmitting means comprises:
laser means; and
means coupled to said analog-to-digital converting means which is responsive to said digital signal comprising said digital version of said scrambled video signal in said baseband format and said second modified sound signal for controlling the output of said laser means.

23. A scrambled video digital transmission link according to claim 22 wherein said means for controlling the output of said laser means comprises means responsive to said digital signal comprising said digital version of said scrambled video signal in said baseband format and said second modified sound signal for turning said laser means on and off.

24. A scrambled video digital transmission link according to claim 22 wherein said analog-to-digital converting means comprises means for providing in parallel a first output signal comprising a digital version of said scrambled video signal and a second output signal comprising a digital version of said second modified sound signal and said means responsive to the output of said analog-to-digital converting means for turning said laser means on and off comprises parallel-to-serial converting means responsive to said first and said second output signals for converting said first and said second output signals of said analog-to-digital converting means from parallel signals to a serial signal.

25. A scrambled video digital transmission link according to claim 22 wherein said means for controlling the output of said laser means comprises means responsive to said digital signal comprising said digital version of said scrambled video signal in said baseband format and said second modified sound signal for modulating the intensity of the output of said laser means.

26. A scrambled video digital transmission link according to claim 25 wherein said means for modulating the intensity of the output of said laser means comprises quaternary phase shift keying means.

* * * * *